United States Patent
Riguer et al.

(10) Patent No.: US 11,307,655 B2
(45) Date of Patent: Apr. 19, 2022

(54) MULTI-STREAM FOVEAL DISPLAY TRANSPORT

(71) Applicant: ATI Technologies ULC, Markham (CA)

(72) Inventors: Guennadi Riguer, Thornhill (CA); Syed Athar Hussain, Scarborough (CA)

(73) Assignee: ATI Technologies ULC, Markham (CA)

( * ) Notice: Subject to any disclaimer, the term of this patent is extended or adjusted under 35 U.S.C. 154(b) by 7 days.

(21) Appl. No.: 16/575,804

(22) Filed: Sep. 19, 2019

(65) Prior Publication Data

US 2021/0089119 A1 Mar. 25, 2021

(51) Int. Cl.
| | | |
|---|---|---|
| *G06F 3/01* | (2006.01) | |
| *G06T 3/40* | (2006.01) | |
| *H04L 29/06* | (2006.01) | |
| *H04L 65/80* | (2022.01) | |
| *H04L 67/131* | (2022.01) | |

(52) U.S. Cl.
CPC .......... *G06F 3/013* (2013.01); *G06T 3/4092* (2013.01); *H04L 65/80* (2013.01); *H04L 67/38* (2013.01)

(58) Field of Classification Search
CPC ....... G06F 3/013; G06T 3/4092; H04L 65/80; H04L 67/38
See application file for complete search history.

(56) References Cited

U.S. PATENT DOCUMENTS

| | | | |
|---|---|---|---|
| 9,024,964 B2 | 5/2015 | Ng | |
| 10,553,016 B2* | 2/2020 | Turner | ................. G06T 15/205 |
| 2005/0047504 A1 | 3/2005 | Sung et al. | |
| 2013/0129245 A1 | 5/2013 | Tin | |
| 2014/0269919 A1 | 9/2014 | Rodriguez | |
| 2014/0376624 A1 | 12/2014 | Li et al. | |

(Continued)

FOREIGN PATENT DOCUMENTS

WO 2018057472 A1 3/2018

OTHER PUBLICATIONS

International Search Report and Written Opinion in International Application No. PCT/IB2020/058783, dated Dec. 1, 2020, 7 pages.

(Continued)

*Primary Examiner* — Xin Sheng
(74) *Attorney, Agent, or Firm* — Kowert Hood Munyon Rankin and Goetzel PC; Rory D. Rankin

(57) ABSTRACT

Systems, apparatuses, and methods for using a multi-stream foveal display transport layer are disclosed. A virtual reality (VR) system includes a transmitter sending a plurality of streams over a display transport layer to a receiver coupled to a display. Each stream corresponds to a different image to be blended together by the receiver. The images include at least a foveal region image corresponding to a gaze direction of the eye and a background image which is a lower-resolution image with a wider field of view than the foveal region image. The phase timing of the foveal region stream being sent over the transport layer is adjusted with respect to the background stream to correspond to the location of the foveal region within the overall image. This helps to reduce the amount of buffering needed at the receiver for blending the images together to create a final image to be driven to the display.

20 Claims, 9 Drawing Sheets

(56) References Cited

U.S. PATENT DOCUMENTS

| | | | |
|---|---|---|---|
| 2015/0055706 A1 | 2/2015 | Xu et al. | |
| 2015/0256850 A1 | 9/2015 | Kottke et al. | |
| 2017/0295373 A1 | 10/2017 | Zhang | |
| 2017/0302918 A1 | 10/2017 | Mammou et al. | |
| 2018/0075811 A1* | 3/2018 | Wacyk | G09G 3/3233 |
| 2018/0109804 A1 | 4/2018 | Saeedi | |
| 2018/0190236 A1 | 7/2018 | Philipp | |
| 2018/0255315 A1 | 9/2018 | Edpalm | |
| 2018/0262758 A1 | 9/2018 | El-Ghoroury et al. | |
| 2019/0043167 A1* | 2/2019 | Steyskal | G06T 1/60 |
| 2019/0045210 A1 | 2/2019 | Guermazi et al. | |
| 2019/0200084 A1* | 6/2019 | Gilson | H04N 5/232945 |
| 2020/0195944 A1 | 6/2020 | Di Cera et al. | |

OTHER PUBLICATIONS

"Co-occurrence matrix", Wikipedia.org, Sep. 7, 2016, 2 pages, https://en.wikipedia.org/wiki/Co-occurrence_matrix. [Retrieved Jul. 31, 2018].

International Search Report and Written Opinion in International Application No. PCT/IB2019/057945, dated Dec. 9, 2019, 8 pages.

International Search Report and Written Opinion in International Application No. PCT/US2019/066295, dated Mar. 4, 2020, 11 pages.

Ella et al., "Dual Mode MIPI C-PHYSM/D-PHYSM Use in VR Display IC", MIPI Alliance Developers Conference, Oct. 19, 2018, 24 pages, https://www.mipi.org/sites/default/files/2018-MIPI-DevCon-Ella-Lukanc-Mixel-Synaptics-Dual-Mode-C-PHY-D-PHY.pdf. [Retrieved Nov. 25, 2020].

* cited by examiner

MULTI-STREAM FOVEAL DISPLAY TRANSPORT

BACKGROUND

Description of the Related Art

As resolutions and refresh rates of displays increase, the required transmission bandwidth of the displayed image becomes a major limiting factor. For virtual reality (VR) and augmented reality (AR) headsets or head mounted displays (HMDs), this becomes an even bigger problem as the physical thickness of the cable is a concern as it hinders user mobility, and adding more wires to transmit higher resolution images is an unacceptable solution. In order to create an immersive environment for the user, VR and AR video streaming applications typically require high resolution and high frame-rates, which equates to high data-rates. In the case of VR and AR displays, it is wasteful to transmit the full uniform resolution image as is commonly done today.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for using a multi-stream foveal display transport layer are disclosed herein. In one implementation, a virtual reality (VR) system includes a transmitter sending a plurality of streams over a display transport layer to a receiver coupled to a display. Each stream corresponds to a different image to be blended together by the receiver to create a composite image for driving to the display. The images include at least a foveal region image corresponding to a gaze direction of the eye and a background image which is a lower-resolution image with a wider field of view than the foveal region image. In another implementation, there could be multiple foveal region images of progressively reduced resolution. The phase timing of the foveal region stream(s) being sent over the transport layer is adjusted with respect to the background stream to correspond to the location of the foveal region within the overall image. This helps to reduce the amount of buffering needed at the receiver for blending the images together to create the composite image to be driven to the display.

Figure 1:
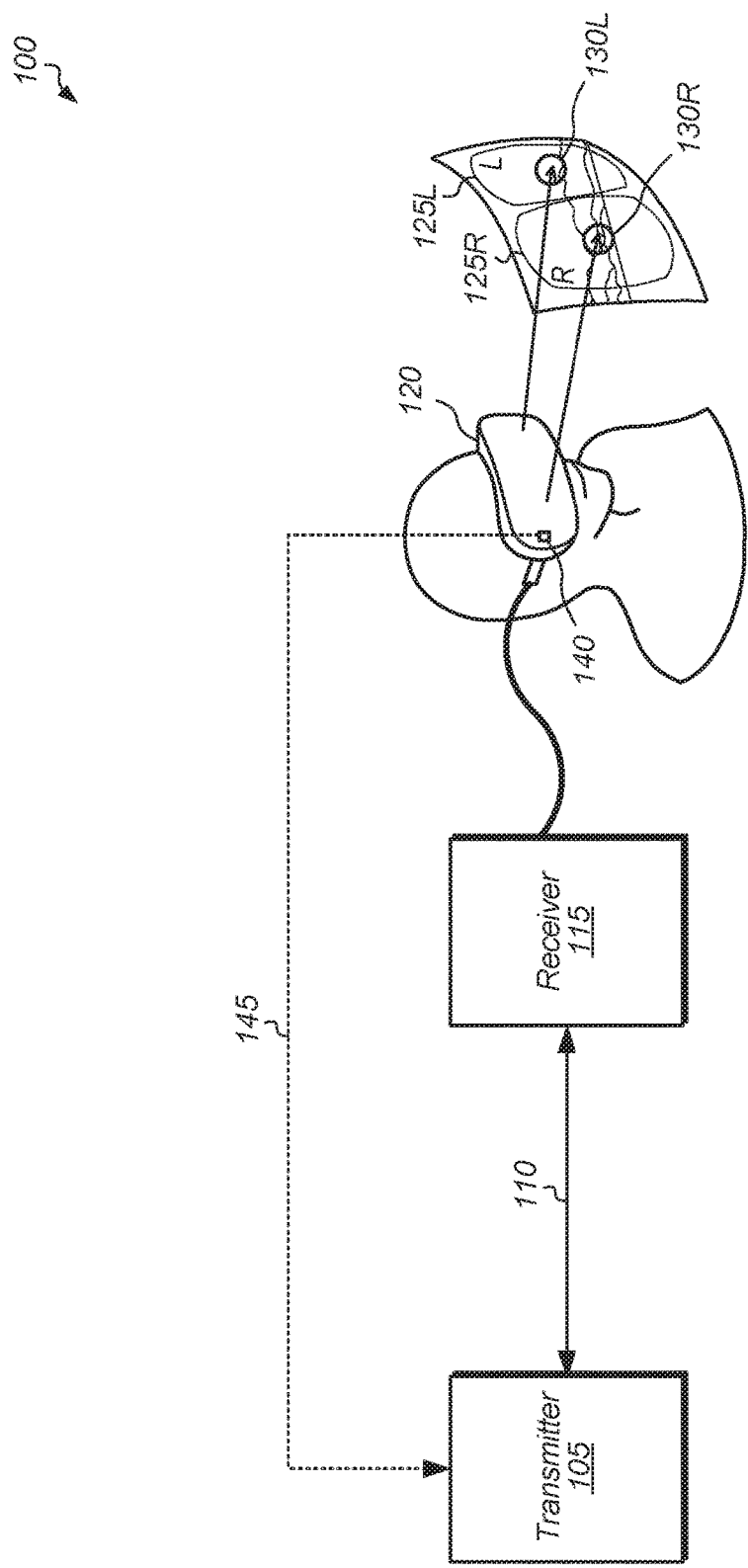
FIG. 1 is a block diagram of one implementation of a system.

Referring now to FIG. 1, a block diagram of one implementation of a system 100 is shown. In one implementation, system 100 includes transmitter 105, channel 110, receiver 115, and head-mounted display (HMD) 120. It is noted that in other implementations, system 100 can include other components than are shown in FIG. 1. In one implementation, channel 110 is a direct wired connection between transmitter 105 and receiver 115. In another implementation, channel 110 is representative of a network connection between transmitter 105 and receiver 115. Any type and number of networks can be employed depending on the implementation to provide the connection between transmitter 105 and receiver 115. For example, transmitter 105 is part of a cloud-service provider in one particular implementation. In a further implementation, channel 110 represents a wireless connection between transmitter 105 and receiver 115.

In one implementation, transmitter 105 receives a video sequence to be encoded and sent to receiver 115. In another implementation, transmitter 105 includes a rendering unit which is rendering the video sequence to be encoded and transmitted to receiver 115. In order to reduce the amount of data transferred, a multi-stream transport of foveated images is used between transmitter 105 and receiver 115. Each stream of the multi-stream sequence corresponds to a different image generated at a different resolution. In one implementation, portions of the available link bandwidth might be statically allocated for each stream. In another implementation, the bandwidth for streams could be dynamically configurable. To reduce the amount of buffering of pixel data at receiver 115, transport of foveated images in their appropriate streams is phase shifted relative to the data stream carrying the background image. When receiver 115 receives the multiple streams, receiver 115 extracts the individual images from the streams and then blends the images together to create a single frame which is then driven to HMD 120. In one implementation, receiver 115 is separate from HMD 120, and receiver 115 communicates with HMD 120 using a wired or wireless connection. In another implementation, receiver 115 is integrated within HMD 120.

Transmitter 105 and receiver 115 are representative of any type of communication devices and/or computing devices. For example, in various implementations, transmitter 105 and/or receiver 115 can be a mobile phone, tablet, computer, server, HMD, another type of display, router, or other types of computing or communication devices. In one implementation, system 100 executes a virtual reality (VR) application for wirelessly transmitting frames of a rendered virtual environment from transmitter 105 to receiver 115. In other implementations, other types of applications (e.g., augmented reality (AR) applications) can be implemented by system 100 that take advantage of the methods and mechanisms described herein.

In one implementation, within each image that is displayed on HMD 120, the scene being displayed on the right side 125R of HMD 120 includes a foveal region 130R while the scene being displayed on the left side 125L of HMD 120 includes a foveal region 130L. These foveal regions 130R and 130L are indicated by the circles within the expanded right side 125R and left side 125L, respectively, of HMD 120. As used herein, the term "foveal region" is defined as the portion of a per-eye displayed half frame where the gaze of each eye is directed. In some cases, the "foveal region" is determined based at least in part on an eye-tracking sensor detecting the location within the half frame where the eye is pointing. Additionally, the term "foveal region" can also be referred to as a "focus region".

In one implementation, the locations of foveal regions 130R and 130L within the right and left half frames, respectively, are determined based on one or more eye-tracking sensors 140 within HMD 120. In this implementation, the eye tracking data is provided as feedback to transmitter 105 and optionally to the rendering source of the VR video. In some cases, the eye tracking data feedback is generated at a frequency higher than the VR video frame rate, and transmitter 105 is able to access the feedback and update the encoded video stream on a per-frame basis. In some cases, the eye tracking is not performed on HMD 120, but rather, the video and other sensor data is sent back to transmitter 105 for further processing to determine the eye's position and movement. In another implementation, the locations of foveal regions 130R and 130L are specified by the VR application based on where the user is expected to be looking. In another implementation, the locations of foveal regions 130R and 130L are determined based on the characteristics of the optical system alone or in combination with eye tracking. It is noted that the size of foveal regions 130R and 130L can vary according to the implementation. Also, the shape of foveal regions 130R and 130L can vary according to the implementation, with foveal regions 130R and 130L defined as ellipses in another implementation. Other types of shapes can also be utilized for foveal regions 130R and 130L in other implementations.

In one implementation, channel 110 supports a multi-stream transport layer to transfer higher-resolution foveal region(s) as well as a lower-resolution background image, using a separate stream for each region and a separate stream for the background image. In some cases, the foveal and background images are transmitted at different refresh rates. For example, if the user has moved their eyes rapidly while the current scene in the VR or AR application is unchanged, then the foveal region is sent at a higher refresh rate than the background image to account for new saccade landing points. In one implementation, transmitter 105 sends mask metadata to receiver 115 specifying how the multiple regions should be combined to create a final, composite image for the frame. Receiver 115 blends the foveal regions with the background image based on the received mask metadata. In one implementation, the mask metadata is supplied as an alpha color channel. In another implementation, the mask metadata is determined analytically. In one implementation, transmitter 105 also sends metadata which specifies a background image scaling attribute to receiver 115. The background image scaling attribute indicates how much the background image should be scaled by receiver 115 before blending with the foveal region(s). Receiver 115 scales the background image based on this received scaling attribute.

In one implementation, in order to minimize the amount of image buffering needed by receiver 115 for storing foveal image data before combining with the background image, the beginning of the foveal image stream is phase-shifted relative to the background image stream to correspond to the location of the foveal region within the frame. In one implementation, streams with foveal images include metadata about the foveal region position relative to the background image, foveal layer composition order, and phase shifting. In one implementation, an adjustment in phase shifting of the foveal region within a corresponding stream is tied to saccadic movement and performed during saccadic suppression. In one implementation, the information about an eye saccade for image shifting within a stream is transmitted from eye-tracking sensor(s) 140 to transmitter 105 using sideband communication interface 145.

When receiver 115 receives the multiple streams, receiver 115 extracts the image from each stream. Then, receiver 115 superimposes the foveal image(s) on the background image to create the final image which will be driven to display 120. Phase shifting the transmission of the foveal image stream(s) in relation to the background image stream reduces the amount of buffering needed on receiver 115 to combine the foveal image(s) with the background image to create the final image.

Figure 2:
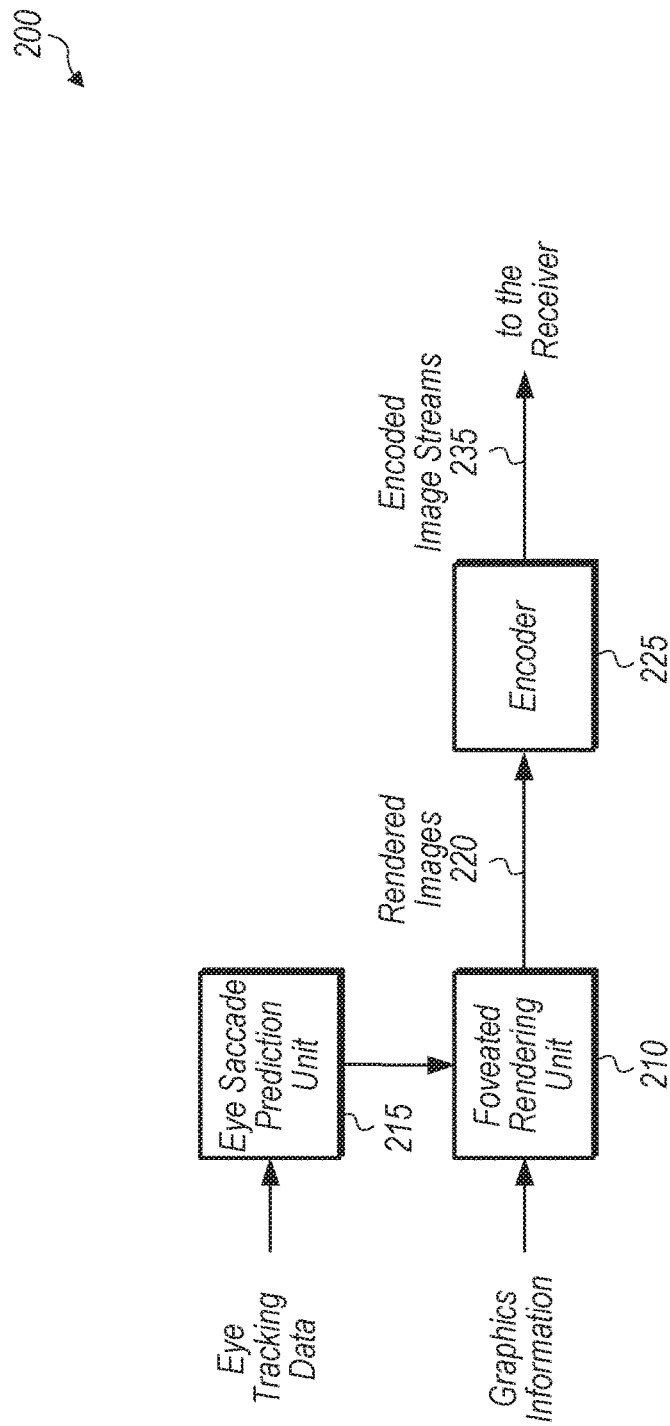
FIG. 2 is a block diagram of one implementation of a transmitter.

Turning now to FIG. 2, a block diagram of one implementation of a transmitter 200 is shown. In one implementation, transmitter 200 includes at least foveated rendering unit 210, eye saccade prediction unit 215, and encoder 225. Alternatively, in another implementation, foveated rendering unit 210 is coupled to transmitter 200 rather than being integrated within transmitter 200. It is noted that transmitter 200 can also include other components which are not shown to avoid obscuring the figure. While foveated rendering unit 210, eye saccade prediction unit 215, and encoder 225 are shown as separate units in FIG. 2, it is noted that in other implementations, any two of these units can be combined together into a single unit or all three units can be combined together into a single unit. Each of rendering unit 210, eye saccade prediction unit 215, and encoder 225 is implemented using any suitable combination of hardware (e.g., control logic, processing unit) and/or software (e.g., program instructions executable by a processing unit).

In one implementation, foveated rendering unit 210 generates rendered images 220 from graphics information (e.g., raw image data). In one implementation, rendered images 220 include two or more images which correspond to a single video frame of a video sequence. It is noted that the terms "image", "frame", and "video frame" can be used interchangeably herein. In one implementation, foveated rendering unit 210 receives foveal region information which specifies the foveal region(s) (e.g., foveal regions 130R and 130L of FIG. 1) within the frame. In one implementation, the foveal region information is provided to transmitter 200 from one or more eye-tracking sensors (e.g., sensor 140) in the HMD (e.g., HMD 120). Foveated rendering unit 210 uses the foveal region information to generate the foveal region image at a relatively higher pixel density than the other images of rendered images 220.

It is noted that in one implementation, each image of rendered images 220 is representative of a pair of images with one image for each eye view of the HMD. For example, in this implementation, each image of rendered images 220 is representative of a pair of images that include a first rendered image for the right eye and a second rendered image for the left eye. Alternatively, each image of rendered images 220 includes left-eye and right-eye portions which are combined together into a single image.

In one implementation, encoder 225 generates multiple encoded streams 235 for each frame from rendered images 220. Then, encoder 225 sends the multiple encoded streams 235 to a receiver for reconstruction, with each stream including a separately encoded image representation of a portion or the entirety of the frame. In one implementation, each stream includes an image at a different resolution from the resolutions of the other images of the other streams. Also, the update rate of each stream is independent of the other streams. Accordingly, in one implementation, the foveal region stream has a higher update rate than the background image stream.

In one implementation, eye saccade prediction unit 215 detects an eye saccade and predicts where the eye will land at the end of the saccade. In one implementation, the detection and prediction are based on eye tracking data. As used herein, the term "saccade" is defined as a rapid movement of the eye between fixation points. For example, eye saccade prediction unit 215 detects an eye saccade based on eye location sensor readings indicating that eye movement is greater than a threshold amount. When an eye saccade is detected, saccade prediction unit 215 predicts where the eye will eventually land on the display. In one implementation, saccade prediction unit 215 also predicts the timing of when the eye will land at the final location. The location and timing predictions are used to determine when to render the foveal region(s) of the next frame to be displayed to the user. Typically, saccadic omission prevents some visual input from being processed for a short period before the rapid eye movement, during the eye movement, and for a short period after the eye movement. However, once the eye stops moving, the brain will start processing new visual data again after a short delay. Therefore, to prevent the user from having a negative viewing experience, the foveated rendering unit 210 will render the foveal region to appear shortly after the predicted landing location of the eye saccade. Also, foveated rendering unit 200 will render the next frame so that the next frame is displayed to the user shortly after the moment when the eye saccade is predicted to end.

In one implementation, rendering unit 210 generates a plurality of images of different resolutions with the data in the foveal region(s) to approximate acuity falloff of the eye. Depending on the type of saccade and probability measure of saccade prediction, the rendering unit 210 will increase the number of images that are rendered per frame and adjust their shape (e.g. elongate image in the direction of saccade, expand the image to cover a larger image portion at the saccade landing point) for some amount of time once the eye saccade is predicted to end to correct for possible landing point prediction errors. For example, in one implementation, during periods of time of negligible eye movement, rendering unit 210 generates two images per frame that will be blended together by the receiver. However, after an eye saccade is detected and landing point uncertainty is estimated to be above certain threshold, rendering unit 210 generates more than two images per frame. This helps to provide a better image to the user that will have fewer visual artifacts. This also helps to provide a better image in the case where there is a small amount of error in the prediction of the eye landing position. In one implementation, in response to an eye saccade being detected, rendering unit 210 generates a foveal region image at a first resolution, a first-intermediate-foveal region image at a second resolution, a second-intermediate-foveal region image at a third resolution, and a background image at a fourth resolution. These four images are sent as separate streams and then blended together at the receiver to generate the image that is driven to the display. In this example, the resolution goes from highest to lowest from the first resolution to the fourth resolution. In other words, the first resolution is higher than the second resolution, the second resolution is higher than the third resolution, and the third resolution is higher than the fourth resolution. Accordingly, if the saccade landing spot prediction is off by a small amount, then the user's eye will land in the first-intermediate-foveal region image, which has a higher resolution than the background image, and so will provide the user with enough detail to prevent noticeable visual artifacts.

Figure 3:
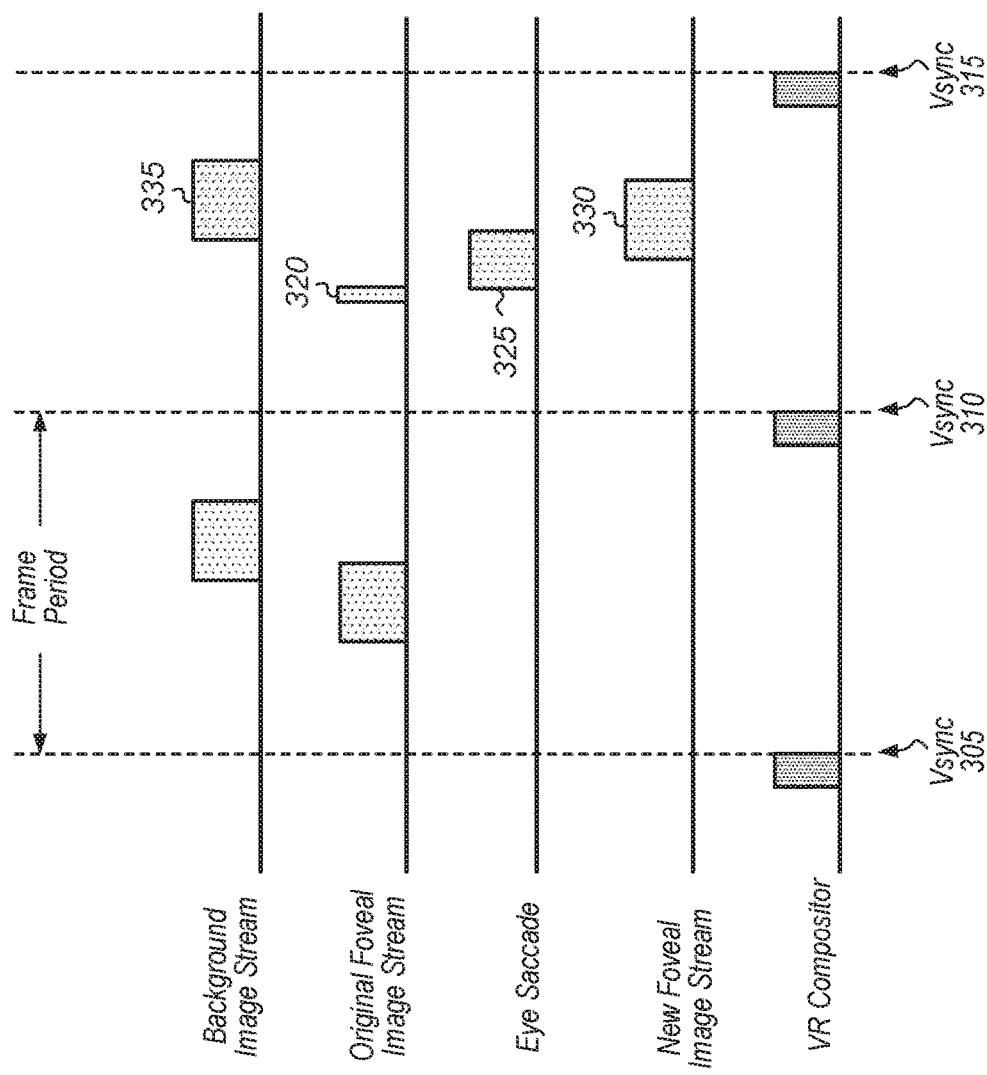
FIG. 3 is a timing diagram of frame timing for rendering and driving frames to a VR or AR display in accordance with one implementation.

Referring now to FIG. 3, a timing diagram 300 of frame timing for rendering and driving frames to a VR or AR display in accordance with one implementation is shown. In one implementation, the boundaries of each frame period are determined by vertical synchronization (VSync) signals. In other words, the start of a frame period coincides with a VSync signal and the end of the frame period coincides with the next VSync signal. For example, the first frame period shown in timing diagram 300 is bounded by VSync 305 and Vsync 310. During the first frame period, an original foveal image stream is sent in a phase-shifted manner with respect to the background image stream over the display transport to the receiver. The phase shifting is performed so that the foveal image stream arrives at the receiver at the point in time when the foveal image will be blended with the background image. The receiver blends the foveal region with the background image and then a VR compositor drives the blended image to a display.

As used herein, the term "frame period" is defined as the reciprocal of the frame rate. In various implementations, frames are driven to a VR display at a fixed or variable frame rate, with the frame rate high enough to provide a positive user experience for the given VR application. It is noted that throughout this disclosure, when a technique is referred to as applicable to a VR application or VR display, it should be understood that the technique is also applicable to AR or other types of immersive applications. When the frame rate for the VR application is fixed for a given period of time, the timing of the Vsync for the next frame to be displayed can be determined.

It is assumed for the purposes of this discussion that the VR system includes an eye saccade detection unit or an eye saccade prediction unit (e.g., eye saccade prediction unit 215 of FIG. 2) that detects and/or predicts an eye saccade during execution of the VR application. As shown in timing diagram 300, an eye saccade 325 has been detected and the prediction of the timing of eye saccade 325 is shown in relation to Vsync signals, the transport of the background image stream, and the transport of the original foveal image stream. As a result of eye saccade 325, the location of the foveal region will move, which will change the optimal timing for sending the foveal image stream on the display transport. In one implementation, since eye saccade 325 is detected prior to the entirety of original foveal image stream 320 being sent, the transmitter aborts the transmission of original foveal image stream 320 since the location of the foveal region has changed. Once eye saccade 325 is over and the eye stops moving, the user will expect the high resolution foveal region to be in the location where the eye gaze is directed.

Accordingly, in one implementation, when eye saccade 325 is detected, a new foveal image is rendered to account for the predicted location of the foveal region when eye saccade 325 ends. The new foveal image stream 330 is sent at a new phase relationship with respect to the background image stream 335 to correspond to when the new foveal image will be blended with the background image. This adjustment in the phase of new foveal image stream 330 is performed if there is sufficient time to render and transmit new foveal image stream 330 prior to the next Vsync 315. If there is not enough time before Vsync 315, then a lower-resolution background image can be displayed to the user for the current frame, and then the appropriate phase relationship between the new foveal image stream and the background image stream will be applied to the subsequent frame.

Figure 4:
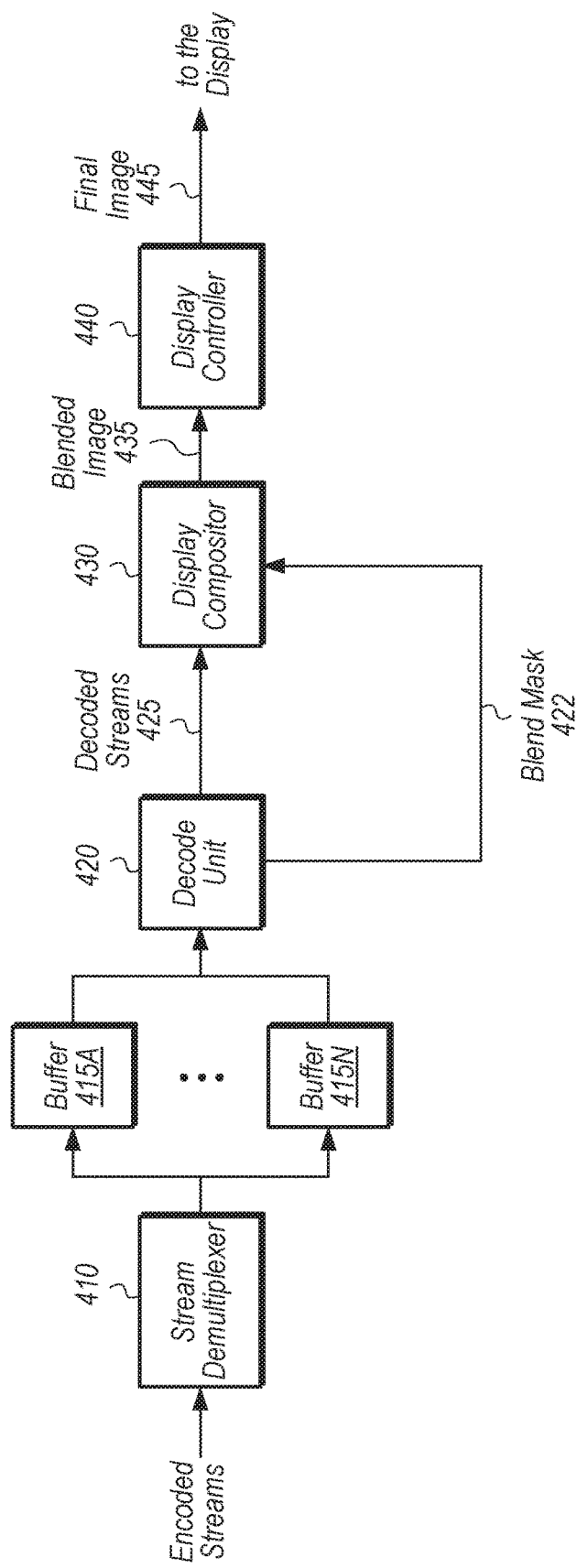
FIG. 4 is a block diagram of one implementation of a receiver.

Turning now to FIG. 4, a block diagram of one implementation of a receiver 400 is shown. In one implementation, receiver 400 is integrated within an HMD (e.g., HMD 120 of FIG. 1). In another implementation, receiver 400 is a separate component from the HMD, and receiver 400 communicates with the HMD over a wired or wireless interface. In one implementation, receiver 400 includes at least stream demultiplexer 410, buffers 415A-N, decode unit 420, display compositor 430, and display controller 440. It is noted that receiver 400 can include other units which are not shown to avoid obscuring the figure. In other implementations, receiver 400 can be structured in other suitable arrangements. It is also noted that two or more of the units shown in FIG. 4 can be combined together into a single unit in other implementations.

In one implementation, receiver 400 receives multiple encoded streams for the frames of a VR or AR application. After receiving the multiple encoded streams, stream demultiplexer 410 separates the encoded streams into the individual component streams. In one implementation, there are two streams in the encoded streams, with the two streams including a relatively high-resolution foveal image and a relatively low-resolution background image. In other implementations, receiver 400 receives more than two encoded streams. The individual component streams are separated out and stored in buffers 415A-N, which are representative of any number of buffers for storing pixel data of the different component streams.

Decode unit 420 retrieves the separate component encoded images from buffers 415A-N and decodes the encoded images. Then, decode unit 420 conveys the decoded images 425 to display compositor 430. Display compositor 430 blends the decoded images 425 together to create a blended image 435 which is provided to display controller 440. In one implementation, decode unit 420 extracts blend mask 422 from the encoded streams and conveys blend mask 422 to display compositor 430. In this implementation, display compositor 430 uses the blend mask 422 to determine how to combine the multiple component images together to create blended image 435. Display controller 440 performs the final adjustments to blended image 435 to create final image 445 which is driven to the display. It is noted that final image 445 can be stored in a frame buffer or other location prior to being driven to the target display.

Figure 5:
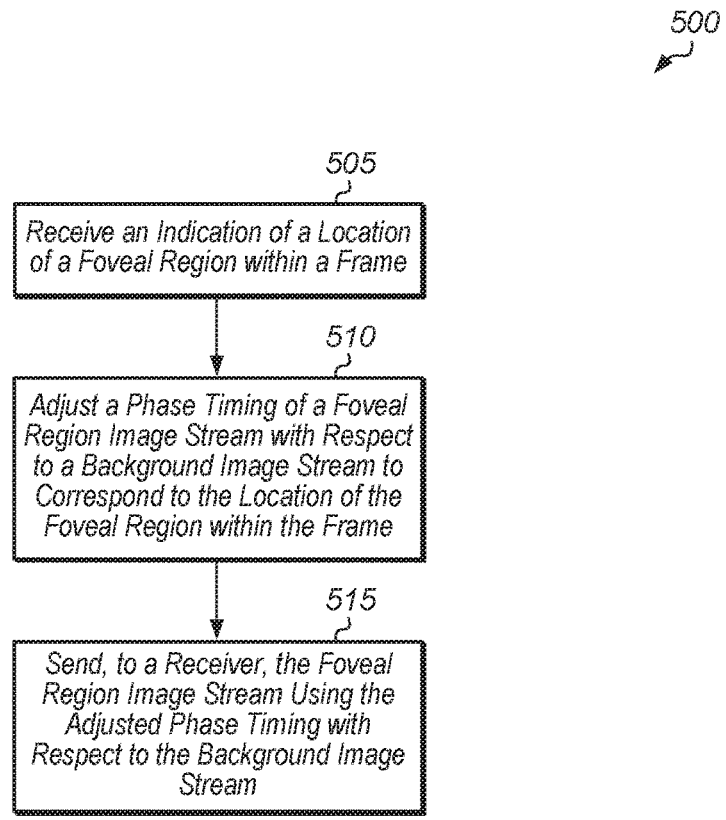
FIG. 5 is a generalized flow diagram illustrating one implementation of a method for adjusting the phase timing of a foveal region stream.
Figure 6:
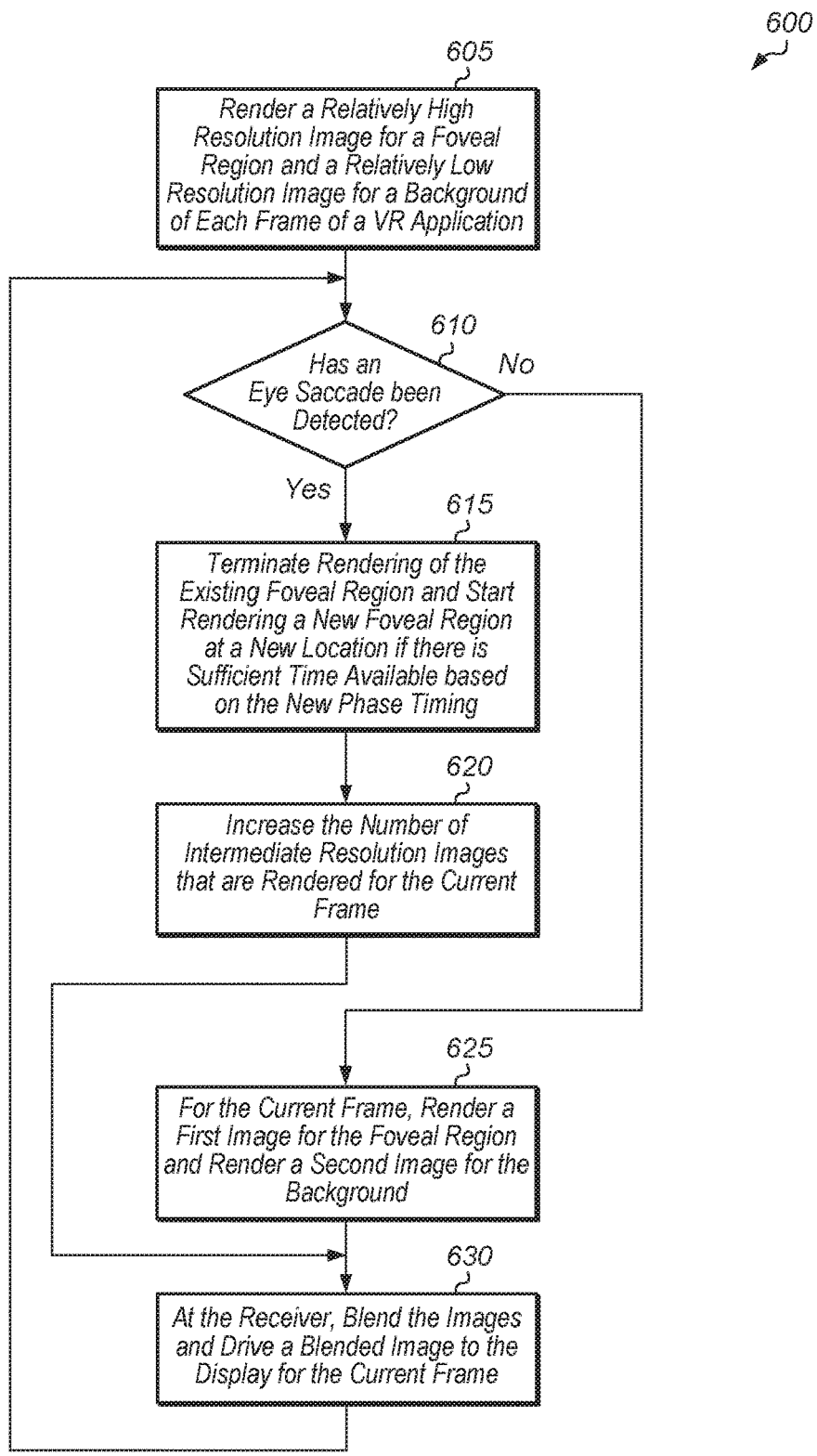
FIG. 6 is a generalized flow diagram illustrating one implementation of a method for increasing the number of intermediate resolution images that are rendered in response to an eye saccade being detected.
Figure 7:
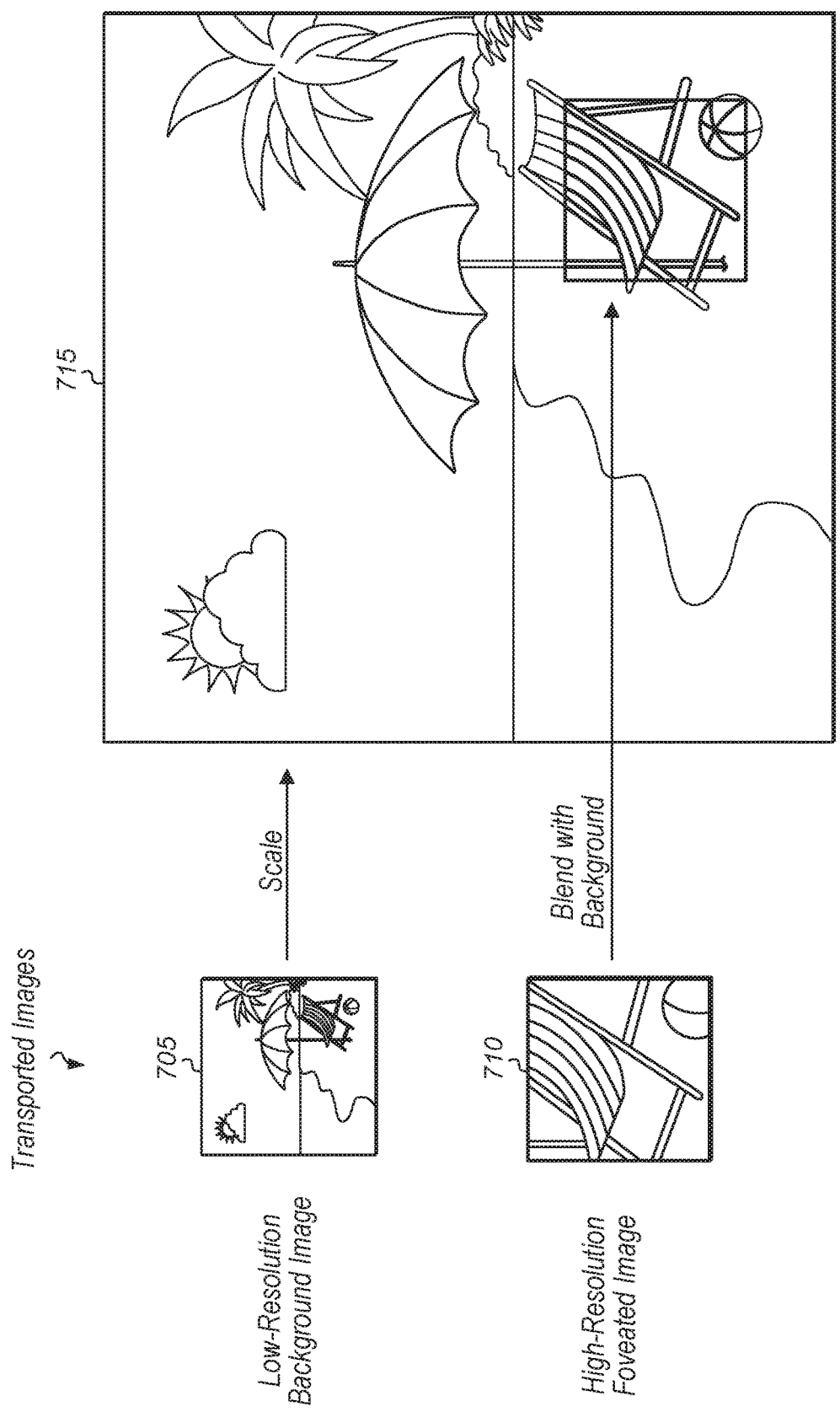
FIG. 7 is a diagram of transported images and a final image in accordance with one implementation.

Referring now to FIG. 5, one implementation of a method 500 for adjusting the phase timing of a foveal region stream is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A transmitter receives an indication of a location of a foveal region within a frame (block 505). In one implementation, the foveal region information is sent to the transmitter via a sideband channel from one or more eye-tracking sensors. The transmitter adjusts a phase timing of foveal region image stream with respect to a background image stream to correspond to the location of the foveal region within the frame (block 510). For example, if the raster order of the display goes from top to bottom, and if the foveal region is located in the upper part of the frame, then the phase timing of when the foveal region image is sent over the transport layer is moved forward to a point which allows the entirety of the foveal region image to be received by the receiver at the point in time when the foveal region image will need to be blended with the background image. Alternatively, if the foveal region is located in bottom part of the screen, then the phase timing of when the foveal region image is sent over the transport layer is adjusted to allow the foveal region image to be fully received by the receiver in time for blending. Next, the transmitter sends, to a receiver, the foveal region image stream using the adjusted phase timing with respect to the background image stream (block 515). After block 515, method 500 ends. As a result of the transmitter performing method 500, the receiver is able to reduce the amount of buffering that is used when blending the foveal region image with the background image.

Turning now to FIG. 6, one implementation of a method 600 for increasing the number of intermediate resolution images that are rendered in response to an eye saccade being detected is shown. A rendering unit renders a relatively high-resolution image for a foveal region and a relatively low-resolution image for a background of each frame of a VR application (block 605). If the rendering unit receives an indication that an eye saccade has been detected for the current frame being rendered (conditional block 610, "yes" leg), then the rendering unit terminates rendering of the existing foveal region and starts rendering a new foveal region at a new location if there is sufficient time available based on the new phase timing (block 615). The receiver will handle the situation when the foveated stream is aborted and a new foveated stream is restarted at a different phase in a different location of the frame. In one implementation, the receiver is capable of dealing with multiple foveated regions within a frame due to such a restart.

Also, in response to the eye saccade being detected, the rendering unit increases the number of intermediate resolution images that are rendered for the current frame (block 620). For example, in one implementation, the rendering unit renders a high-resolution foveal region, a medium-high resolution region surrounding the foveal region, a medium-resolution region surrounding the medium-high resolution region, and a low-resolution background image. In other implementations, the rendering unit renders other numbers of regions (greater than two) with varying amounts of resolution. In another implementation, for systems that use non-uniform resolution rendering techniques, multiple foveal layers could be generated from a higher resolution image. If an eye saccade has not been detected for the current frame (conditional block 610, "no" leg), then for the current frame, the rendering unit renders a first image for the foveal region and a second image for the background (block 625). At the receiver, after the images are blended, a blended image is driven to the display for the current frame (block 630), method 600 returns to conditional block 610.

Referring now to FIG. 7, a diagram of transported images and a final image in accordance with one implementation is shown. One example of a low-resolution background image 705 is shown on the top left of FIG. 7, and one example of a high-resolution foveated image 710 is shown on the bottom left of FIG. 7. In one implementation, these two images 705 and 710 are sent from the transmitter to the receiver, with the phase-timing of the corresponding image streams adjusted based on the location of foveal region within the overall image. The receiver then blends images 705 and 710 together to create final image 715. It should be understood that other numbers of images can be sent to the receiver to be blended together to create a final image in other implementations. In these other implementations, the phase timing of each higher-resolution image stream that is sent on the transport layer will be adjusted with respect the background image stream based on the locations of the corresponding region within the overall image.

Figure 8:
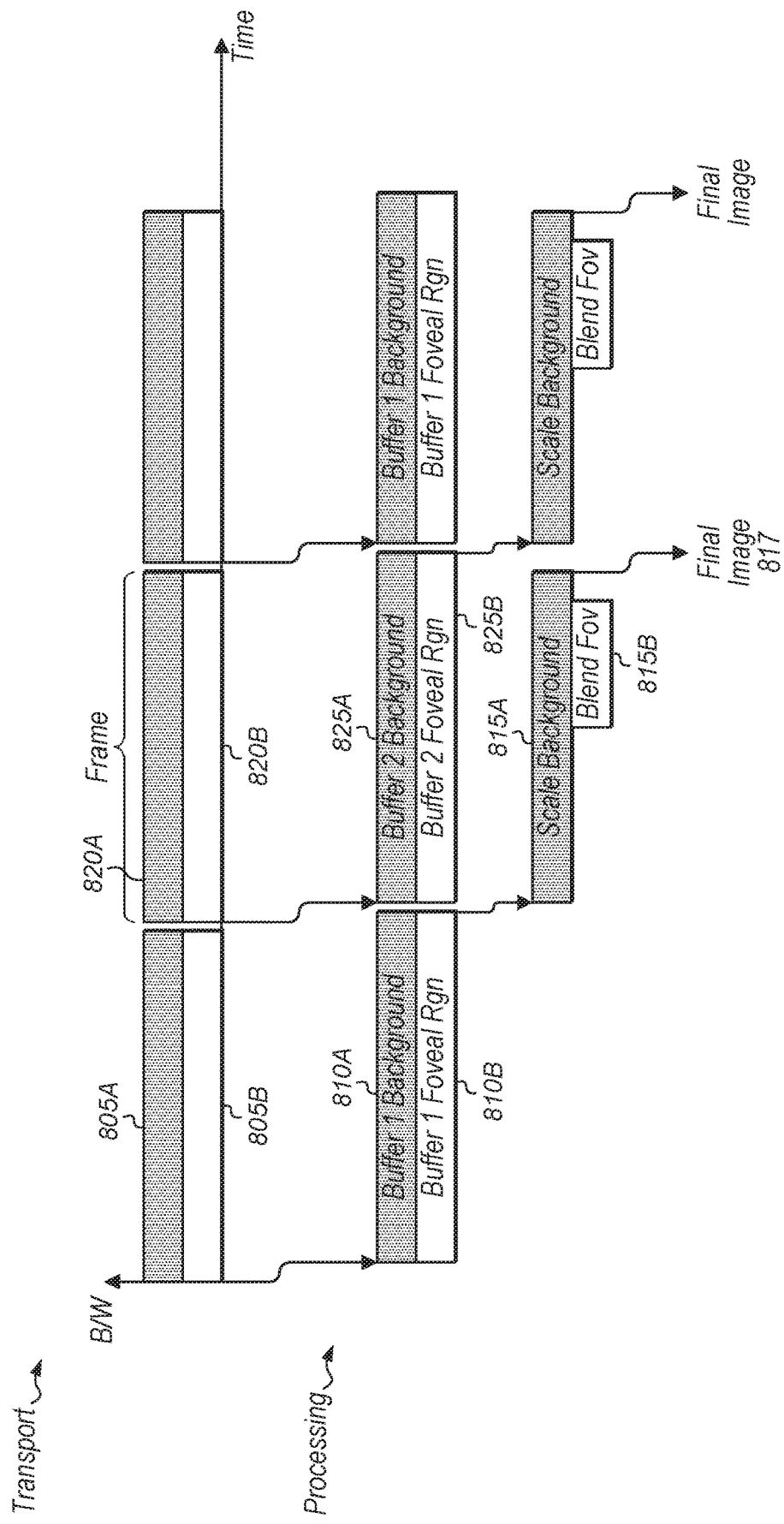
FIG. 8 is a timing diagram of a regular multi-stream display transport in accordance with one implementation.

Turning now to FIG. 8, a timing diagram of a regular multi-stream display transport in accordance with one implementation is shown. The timing of images being sent over the transport layer is shown at the top of FIG. 8. In this example, it is assumed that there are two separate image streams being sent, but it should be understood that this is merely indicative of one implementation. In other implementations, other numbers of images can be rendered with corresponding image streams being sent from the transmitter to the receiver. As shown, background image 805A and foveal image 805B are sent in phase over the transport layer, with background image 805A and foveal image 805B corresponding to a single frame being rendered and intended for display at the receiver. In one implementation, background image 805A and foveal image 805B are interleaved as they are sent over the transport layer.

The timing of the processing of images at the receiver is shown below the transport timing blocks. After background image 805A and foveal image 805B are sent in-phase over the transport layer to the receiver, the receiver stores the images in buffers 810A and 810B, respectively. Then, after both background image 805A and foveal image 805B have been fully buffered, background image 805A is scaled as indicated by block 815A. Based on the location of foveal image 805B within the image, the blending of the foveal image 805B starts at the appropriate time with respect to the scaling of background image 805A. The blending is represented by block 815B. The final image 817 is generated as a result of the scaling 815A and blending 815B steps. As shown in FIG. 8, it is assumed that foveal image 805B is located within background image 805A as is shown for foveated image 710 with respect to background image 705 (of FIG. 7). For other locations of a foveated image within the overall image, the timing of blending block 815B can be shifted to match the location. For example, if the foveated image is in the top left corner of the background image, then blending block 815B would be shifted left and performed earlier within the scaling 815A of the background image.

While the scaling 815A is performed, a new background image 820A and a new foveal image 820B are being sent to the receiver and stored in buffers 825A and 825B, respectively. Two pairs of buffers 810A-B and 825A-B are needed since the background image 805A is being blended with foveal image 805B at the same time that background image 820A and foveal image 820B are being received. This timing pattern can continue for subsequent images being sent from the transmitter and processed by the receiver.

Figure 9:
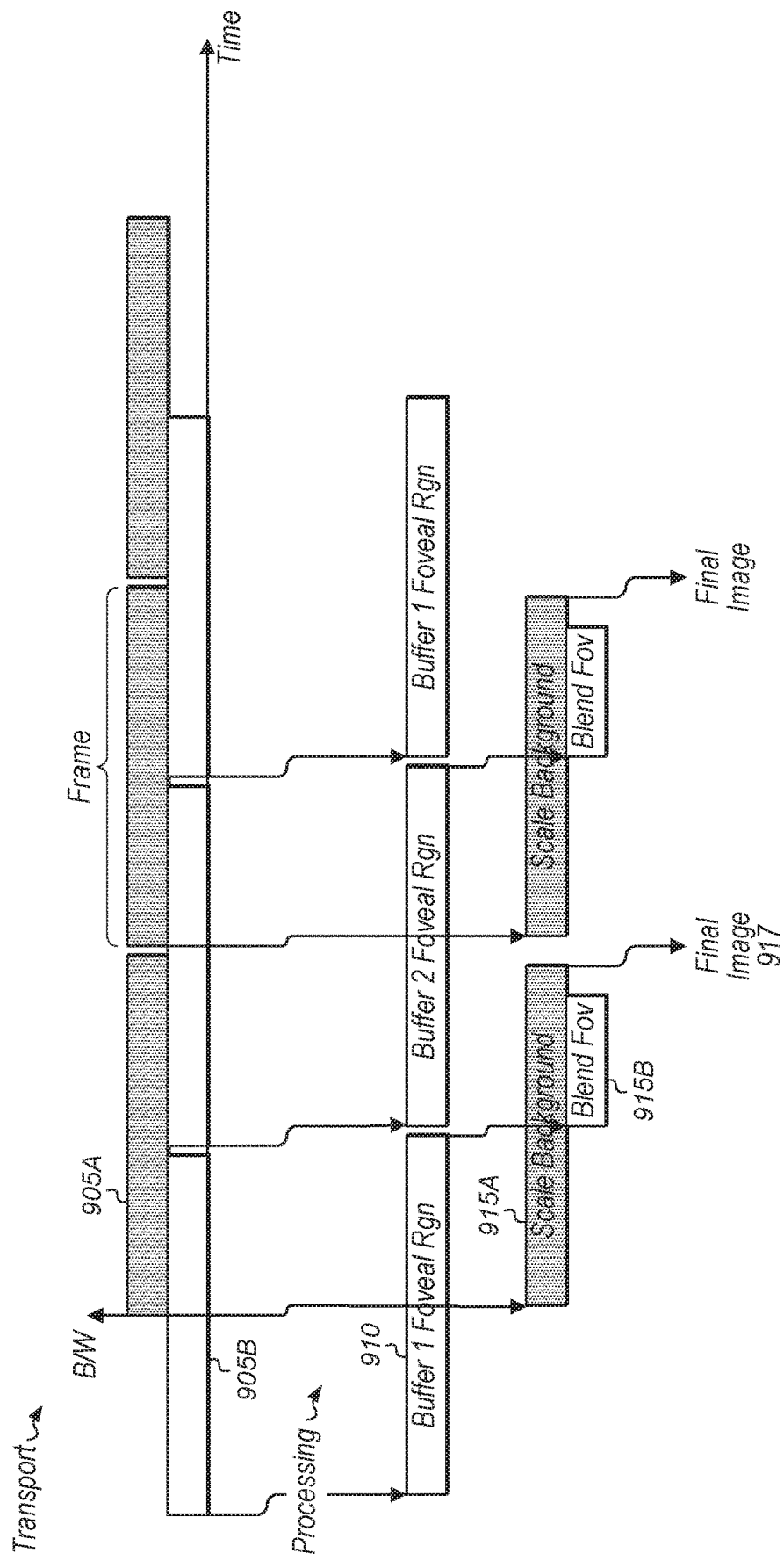
FIG. 9 is a timing diagram of a phase-shifted multi-stream display transport in accordance with one implementation.

Referring now to FIG. 9, one implementation of a timing diagram of a phase-shifted multi-stream display transport is shown. The timing diagram of FIG. 9 illustrates a more efficient transport layer for transmitting a background image stream and a foveal image stream. The transmission of the foveal image stream is phase-shifted with respect to the background image stream to reduce the amount of buffering that is needed at the receiver. This phase-shifting is shown with foveal image 905B being sent earlier in time than background image 905A. The background image is scaled as it is received as shown in block 915A, preventing the need for a buffer for the background image. The foveal image stream is buffered in buffer 910 by the receiver as it is received, and then the buffered foveal image is blended with the background image at the appropriate time based on the location of the foveal region within the overall image. The blending of the buffered foveal image 905B with the background image 905A is shown as block 915B. The final image 917 is generated as a result of the scaling 915A and blending 915B steps. This timing pattern will continue for subsequent frames while the location of the foveal region remains the same.

During an eye saccade, the location of the foveal region is changing quickly. If the transmission of the foveal image stream over the transport layer has already been initiated when an eye saccade is detected, the transmitter can abort the transmission of the foveal image stream and restart a new foveal image stream at the correct phase location with respect to the background image stream.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a rendering unit, comprising circuitry, configured to render a plurality of regions of a frame, wherein each region of the plurality of regions is rendered at a different resolution from other regions; and
    a transmitter, comprising circuitry, configured to:
        transmit each region of the plurality of regions as a separate image in a separate stream to a receiver; and transmit a first stream by shifting a phase of the first stream with respect to a second stream by changing a time at which the first stream is transmitted, wherein the phase is shifted by an amount which corresponds to a location of a foveal region within the frame, wherein the first stream contains the foveal region, and wherein the second stream contains a background image.

2. The system as recited in claim 1, wherein:
the foveal region is updated at a first refresh rate;
the background image is updated at a second refresh rate; and
the second refresh rate is different from the first refresh rate.

3. The system as recited in claim 1, wherein the rendering unit is further configured to increase a number of regions being rendered at different resolutions responsive to receiving an indication that an eye saccade has been detected.

4. The system as recited in claim 3, wherein the rendering unit is further configured to:
render two separate regions for a first frame prior to receiving the indication; and
render more than two separate regions for a second frame subsequent to receiving the indication.

5. The system as recited in claim 3, wherein the rendering unit is further configured to adjust a refresh rate of the foveal region responsive to receiving the indication.

6. The system as recited in claim 1, wherein the transmitter is further configured to convey a blend mask to the receiver to specify how to combine the plurality of regions to create the composite image.

7. The system as recited in claim 1, wherein the transmitter is further configured to convey a background image scaling attribute to the receiver to specify how to scale the background image.

8. A method comprising:
rendering, by a rendering unit comprising circuitry, a plurality of regions of a frame, wherein each region of the plurality of regions is rendered at a different resolution from other regions;
transmitting, by a transmitter comprising circuitry, each region as a separate image in a separate stream to a receiver; and
transmitting a first stream by shifting a phase of the first stream with respect to a second stream by changing a time at which the first stream is transmitted, wherein the phase is shifted by an amount which corresponds to a location of a foveal region within the frame, wherein the first stream contains the foveal region, and wherein the second stream contains a background image.

9. The method as recited in claim 8, wherein:
the foveal region is updated at a first refresh rate;
the background image is updated at a second refresh rate; and
the second refresh rate is different from the first refresh rate.

10. The method as recited in claim 8, further comprising increasing a number of regions being rendered at different resolutions responsive to receiving an indication that an eye saccade has been detected.

11. The method as recited in claim 10, further comprising:
rendering two separate regions for a first frame prior to receiving the indication; and
rendering more than two separate regions for a second frame subsequent to receiving the indication.

12. The method as recited in claim 10, further comprising adjusting a refresh rate of the foveal region responsive to receiving the indication.

13. The method as recited in claim 8, further comprising conveying a blend mask to the receiver to specify how to combine the plurality of regions to create the composite image.

14. The method as recited in claim 8, further comprising conveying a background image scaling attribute to the receiver to specify how to scale the background image.

15. A system comprising:
a transmitter, comprising circuitry, configured to:
render a plurality of regions of a frame, wherein each region of the plurality of regions is rendered at a different resolution from other regions;
transmit each region as a separate image in a separate stream to a receiver; and
transmit a first stream by shifting a phase of the first stream with respect to a second stream by changing a time at which the first stream is transmitted, wherein the phase is shifted by an amount which corresponds to a location of a foveal region within the frame, wherein the first stream contains the foveal region, and wherein the second stream contains a background image; and
the receiver configured to:
combine the plurality of regions from a plurality of streams to create a composite image; and
drive the composite image to a display.

16. The system as recited in claim 15, wherein:
the foveal region is updated at a first refresh rate;
the background image is updated at a second refresh rate; and
the second refresh rate is different from the first refresh rate.

17. The system as recited in claim 15, wherein the transmitter is further configured to increase a number of regions being rendered at different resolutions responsive to receiving an indication that an eye saccade has been detected.

18. The system as recited in claim 17, wherein the transmitter is further configured to:
render two separate regions for a first frame prior to receiving the indication; and
render more than two separate regions for a second frame subsequent to receiving the indication.

19. The system as recited in claim 17, wherein the transmitter is further configured to adjust a refresh rate of the foveal region responsive to receiving the indication.

20. The system as recited in claim 15, wherein the transmitter is further configured to convey a blend mask to the receiver to specify how to combine the plurality of regions to create the composite image.

* * * * *